Patented Dec. 9, 1952

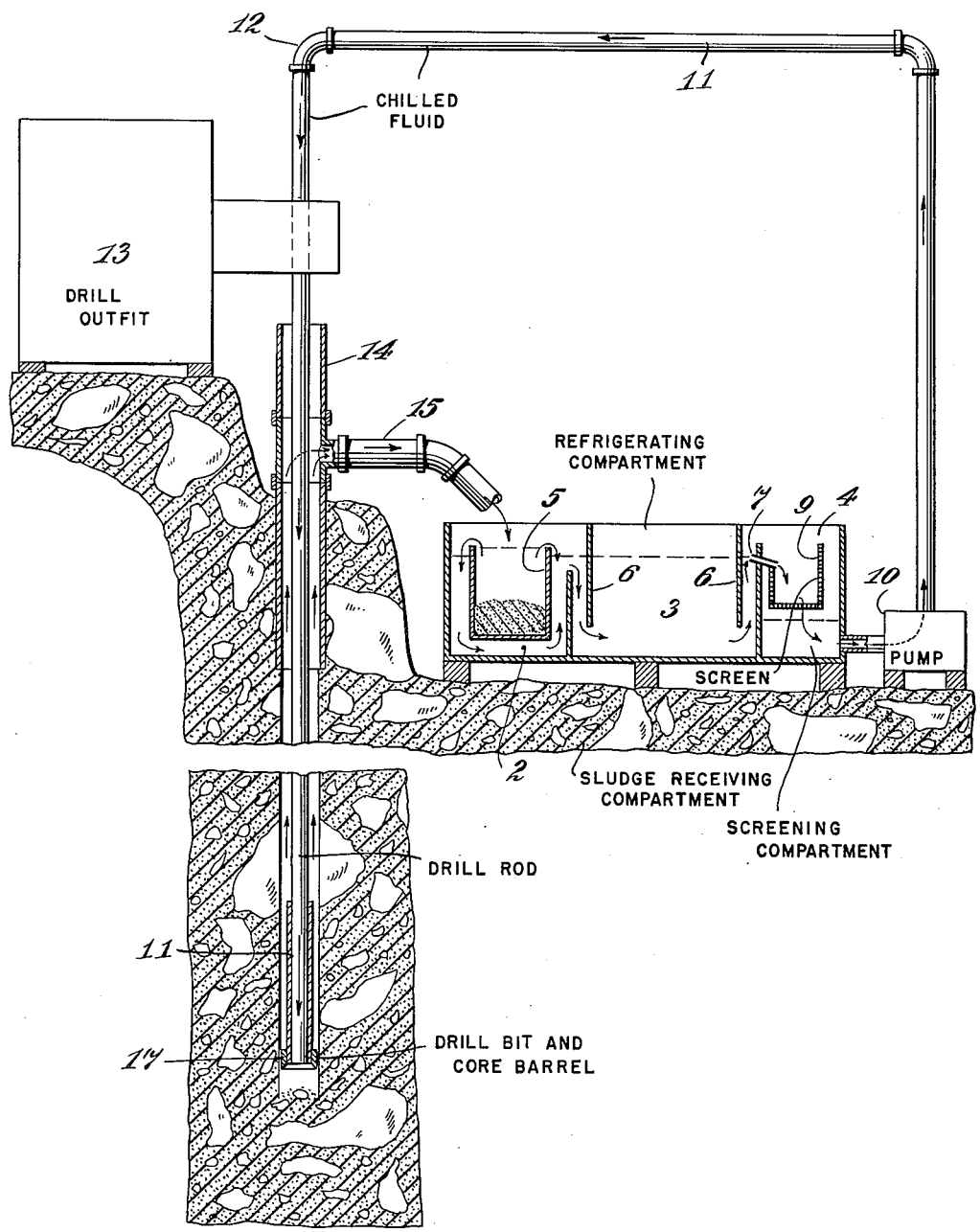

2,621,022

UNITED STATES PATENT OFFICE 2,621,022

METHOD OF DRILLING OVERBURDEN, UNCONSOLIDATED ROCK FORMATION OR PLACER GROUND WITH LOW-TEMPERATURE FREEZING FLUIDS

John D. Bardill, Hanover, N. H., assignor to the United States of America as represented by the Secretary of the Interior Application February 9, 1945, Serial No. 576,986

1 Claim. (Cl. 255—1.8)

(Granted under the act of March 3, 1883, as amended April 30, 1928; 370 O. G. 757)

The invention herein described and claimed may be manufactured and used by or for the Government of the United States of America for governmental purposes without the payment of any royalties thereon or therefor.

This invention relates to methods of drilling overburden, unconsolidated rock formation, placer ground or bedrock, in which the moisture in the walls are frozen to prevent sloughing of the walls or core during drilling.

Heretofore it has been proposed to substitute for the mud fluid made by mixing a suitable clay with water, in the drilling of holes, a brine of sodium chloride, calcium chloride or similar material, with or without oil. This brine was to be circulated, and cooled, whereby the earth formation surrounding the well was to be frozen by the brine cooled by a refrigerating apparatus, and which prevented heaving or sloughing. Thereby the well was to be drilled and the casing set, without taking time to remove caved or sloughed material. As far as known, this proposed method has not gone into practical use.

The objection to the method proposed as described is that the water of the ground or rock mixing with the brine will cause part of the brine to be frozen in the walls, or to mix with the circulating brine thus diluting it in an unpredetermined manner in consequence of which the temperatures of the so-called brine then change to a considerable and uncertain extent throughout the circuit including that in the refrigerating apparatus. This is particularly so when the fluid is first pumped through the circuit and then cooled or refrigerated.

This invention has for its object to provide a fluid medium for an open or closed drilling circuit which would not be subject to the objections pointed out, and the invention consists in such a fluid medium which will not harmfully mix with the water of the ground or rock, and which has the capacity of being refrigerated to a low degree of temperature, below that of the ground water in order to freeze such water, without it itself being frozen therewith, and which thus remains substantially constant in its heat transfer characteristics. At the same time such a fluid medium should have the capacity of giving up its heat rapidly, in order to thereby have its own temperature reduced and be capable of being transferred under such low temperature status until it meets with the water of the ground from which the heat would be abstracted.

After considerable researching and testing, I have found that kerosene of a viscosity of centipoises of 0° C.-3.8; —10° C.-5; —20° C.-6.4; and —30° C.-7.5 acted in a manner unexpected from the analogy of brine, in that it did not harmfully mix with water, but on the contrary separated readily therefrom, its characteristics being such as not to form films with the water, as is the case in the use of oils. Further tests showed that its normal heat as when used in general open air conditions, could be quickly and easily absorbed in the presence of a refrigerant medium, and thus its temperature reduced to its lowest possible which is about minus 50° F. The preferred refrigerant medium which has given good results is solid carbon dioxide, having a boiling point of about —109° F.

In my preliminary researches and tests, I found that the use of kerosene oil with the carbon dioxide in the environment set forth brought about entirely unexpected results. Kerosene has certain unique characteristics. I found that any oil should not be employed as the refrigerated medium vehicle because most oils become very viscous when in direct contact with, for example, solid carbon dioxide. The viscosity increases to the point where a gummy coating is formed and surrounds the pieces of solid carbon dioxide, thereby coating it to the point where the evaporation (conversion from solid to gaseous carbon dioxide) is retarded and the refrigerating effect of the carbon dioxide almost ceases. Brines cannot be successfully employed as the refrigerated medium vehicle with solid carbon dioxide as a refrigerant, because the brines, having a much higher freezing point than the boiling point of solid carbon dioxide, form a coating on the pieces of solid carbon dioxide, retarding the chilling effect of the refrigerant. The action is similar to that of oils when used as the chilled low temperature medium vehicle.

Most brines and oils will either freeze or become so viscous that they will not circulate in the drilling circuit when solid carbon dioxide or a similar refrigerant is used to chill them.

Brines or water soluble oil mixtures in water cannot be employed as a substitute for oils, in which an appreciable amount of water is soluble, because in the case where a deep hole is drilled and the returning fluid approaching the surface becomes warmed by the earth's heat, the moisture in the ground being soluble in these brines or water soluble oil mixtures will dilute the brines or oil mixtures, thereby raising the freezing point of these brines or mixtures. Brines containing calcium chloride are subject to the action of vapor pressures and deliquescence.

Solid or liquid refrigerants such as liquid air or liquid oxygen are not desirable substitutes for solid carbon dioxide, liquid nitrogen, or solid nitrogen because they tend to form combustible or explosive mixtures.

When kerosene oil is used as the chilling fluid medium, an inert refrigerant such as solid carbon dioxide, liquid or solid nitrogen, when they are converted by evaporation or boiling to the gaseous state, form a fire-extinguishing blanket of gas in the chilling unit, thereby eliminating all fire hazards.

Kerosene oil does not become harmfully diluted by moisture from the ground. It does not throw off poisonous vapors, nor amalgamate with other elements. It has no impurities which readily oxidize.

The invention will be more fully described hereinafter, the application of the invention to a practical form will be shown in the drawings, and the invention will be finally pointed out in the claim.

In the accompanying drawings, the sludge receptacle 5 receives sludge or cuttings, and these settle and the clear fluid overflows into the compartment 2 and then enters refrigerating compartment 3. The chilled fluid medium vehicle from the refrigerating compartment 3 overflows through a weir into a screen 9 where particles of ice or extraneous material are screened out. The fluid level in the sludge and refrigerating compartments 2 and 3 is governed by the height of the overflow weir 7. The fluid level in the compartments 2 and 3 should be kept low enough so that when the refrigerant is first introduced to the refrigerating compartment 3, the effervescence of the warm fluid caused by the refrigerant (such as solid carbon dioxide) does not cause the fluid to overflow the tank. The purpose of the two baffles 6 in the refrigerating compartment 3 is to deflect the warm fluid to the bottom of the refrigerating compartment where it is coldest.

The chilled fluid from the screen compartment 4 discharges into the suction end of a pump 10 from whence the fluid 11 is conducted through pipe lines or conduits to the swivelhead 12 of the drill. The chilled fluid 11 is pumped through the swivel-head 12 of the drill, through the drill rods, casing, core barrel, etc., and discharges at the tip or side of the drill bit 17. The chilled fluid discharging at the bit tip passes upward outside the drill rods freezing the walls of the drill hole and finally discharges through a pipe 15 into the sludge-receiving compartment 2 of the refrigeration unit. The short casing at the collar of the hole is represented by 14 and the diamond drill outfit as a whole by 13.

As an example, there is mixed in the tank about 600 gallons of kerosene at about 70° F., and about 300 pounds of Dry Ice in cake form. The heat transfer action takes place by the heat of the kerosene flowing to the cooler Dry Ice and this is set to boiling and evaporating. The kerosene has its temperature reduced to less than the freezing point of water, and generally in a range of from minus 10° F. to about minus 50° F. The above quantities were selected for a certain drilling circuit, but vary with different circuits. Sufficient Dry Ice is used to chill the kerosene quantity contained in any drilling circuit, to the desired temperature, to maintain it below the freezing point of the water of the ground; and then the kerosene with its inherent cold is utilized in the circuit devoid of any Dry Ice. This description applies to the first cycle. It is refrigerated for each succeeding cycle. The operating temperature will be governed by various conditions, as ground temperature, moisture content, volume of vehicle circulated, depth of hole, size of hole, etc.

After the kerosene has been cooled to the desired point, the evaporation gases of the Dry Ice, can be gathered and recompressed and used again. If any such refrigerant is inflammable, it can be compressed for economy and safety reasons.

Any petroleum distillate having a boiling point below zero, among which there may be included propane, methane, ethane, propylene etc., and which do not chemically combine with kerosene or the like, or has a purpose of use not inherently objectionable, may be used in the place of carbon dioxide as a refrigerant.

Methane has a boiling point of −161° C.; ethane −88° C.; propane −45° C.; iso-butane −10° C.; cyclo-propane −34° C. (750 mm.); ethylene −104° C.; iso-butylene −6° C.; acetylene −84° C.; methyl acetylene −27° C.; and provided no objectionable features are encountered, any of them may be used as refrigerants in place of the others set forth.

The kerosene may be substituted by a mixture of kerosene and either naphtha bearing oil, or paraffine bearing oil, to increase its viscosity, to seal the pores of the ground, the larger quantity of the kerosene of the mixture returning in the circuit. When such a mechanical mixture of kerosene and paraffin bearing oil, for instance, is used in the circulating load, then as the temperature is lowered the paraffin oil becomes more viscous, and forms a filler, while the kerosene which maintains its original viscosity throughout the temperature to which it is subjected, separates from the more viscous oil. The kerosene may filter out leaving the more viscous oil to act as a seal.

As an example of the improvement of this process, a drill hole was drilled at an angle of 45° below the horizontal, 90 feet to bedrock, requiring with water 24 eight-hour shifts. A similar hole was drilled, at an angle of 60° below the horizontal, using the new method of freezing with low temperature fluid medium, and this required six hours to drill about 88 feet.

As is known, the purpose of the freezing of the drill hole walls is to prevent caving of the walls preparatory to casing the hole or to maintain an open hole while sampling the material being drilled, or to recover a core of the material representative of the ground or rock being drilled.

Unconsolidated rock formation is defined as any formation not capable of cohering sufficiently to stand without artificial support as the walls of an uncased hole. Such unconsolidated material is encountered chiefly as overburden, but may also occur within or below a consolidated formation, or sequence of consolidated formations.

This invention is principally for application with various types of drilling, such as diamond-drilling, seismograph drilling, Empire drilling, oil well drilling, churn drilling, or other types of drilling by varying the type of equipment to the particular type of drilling employed.

From the foregoing it is noted that the invention consists in subjecting the wall of a drill hole having ground moisture to the action of a fluid medium vehicle, such as kerosene oil, chilled by a refrigerant, said vehicle being substantially non-miscible with said ground moisture, whereby said wall is frozen without the vehicle being frozen.

I have described various embodiments of the invention but changes may be made therein without departing from the spirit of the invention as defined in the claim:

I claim as new:

In a method of drilling by the use of a circulating refrigerating fluid from its source of refrigeration through the drill hole during the drilling thereof for consolidating of otherwise unconsolidated formations, and back to the source of its refrigeration, the method which consists in subjecting, remote from the drill hole, kerosene only directly to solid carbon dioxide during its evaporation for lowering the temperature of said kerosene to not less than minus 50° F., and then subjecting said kerosene at a temperature below the freezing point of water to the moisture containing material of a wall of the drill hole, to freeze the moisture by heat exchange increasing the temperature of the kerosene, and then re-refrigerating the same kerosene remote from the drill hole by again directly subjecting it to solid carbon dioxide, the kerosene remaining non-soluble by said moisture and of the same viscosity throughout said temperature range, and throughout its circulation.

JOHN D. BARDILL.

REFERENCES CITED

The following references are of record in the file of this patent:

UNITED STATES PATENTS

| Number | Name | Date |
|---|---|---|
| 1,974,145 | Atwell | Sept. 18, 1934 |
| 2,099,825 | Rolshausen et al. | Nov. 23, 1937 |
| 2,193,219 | Bowie et al. | Mar. 12, 1940 |
| 2,223,027 | Dawson | Nov. 26, 1940 |
| 2,241,273 | Robinson et al. | May 6, 1941 |
| 2,297,660 | Mazee | Sept. 29, 1942 |